United States Patent
Nakamichi (10) Patent No.: US 10,520,847 B1
(45) Date of Patent: Dec. 31, 2019

(54) EXPOSURE HEAD, IMAGE FORMATION APPARATUS, READING HEAD, AND READING APPARATUS

(71) Applicant: Oki Data Corporation, Tokyo (JP)

(72) Inventor: Ren Nakamichi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/412,413

(22) Filed: May 15, 2019

(30) Foreign Application Priority Data

Jun. 22, 2018 (JP) ................................. 2018-118961

(51) Int. Cl.
*G03G 15/04* (2006.01)
*G03G 15/043* (2006.01)
*H04N 1/10* (2006.01)
*H04N 1/00* (2006.01)

(52) U.S. Cl.
CPC ... *G03G 15/04036* (2013.01); *G03G 15/0435* (2013.01); *H04N 1/00798* (2013.01); *H04N 1/1048* (2013.01); *H04N 1/1061* (2013.01)

(58) Field of Classification Search
CPC ......... G03G 15/04036; G03G 15/0435; H04N 1/00798; H04N 1/1048; H04N 1/1061
See application file for complete search history.

(56) References Cited

U.S. PATENT DOCUMENTS 6,219,074 B1 * 4/2001 Chosa ........................ B41J 2/45
257/100
7,660,022 B2 * 2/2010 Uematsu ........... G02F 1/133526
347/238

FOREIGN PATENT DOCUMENTS

JP 2013-015847 A 1/2013

* cited by examiner

*Primary Examiner* — Hoang X Ngo
(74) *Attorney, Agent, or Firm* — Metrolex IP Law Group, PLLC (57) ABSTRACT

An exposure head according to one or more embodiments may include: a light emitting element board on which light emitting elements are arranged; a holder that holds the light emitting element board and is provided with an opening; a transparent cover arranged at a position to shield the opening, such that a first attachment surface of the holder is attached to a second attachment surface of the transparent cover by using an adhesive; and an optical system arranged between the light emitting element board and the transparent cover. The exposure head satisfies an expression defined as $\theta 1 < \theta 2$, where $\theta 1$ is a contact angle on the first attachment surface representing wettability of the first attachment surface, and $\theta 2$ is a contact angle on the second attachment surface representing wettability of the second attachment surface.

14 Claims, 8 Drawing Sheets

FIRST EMBODIMENT

FIRST EMBODIMENT

RELATED ART

FIG. 10

SECOND EMBODIMENT

FIG. 11

SECOND EMBODIMENT

FIG. 12

THIRD EMBODIMENT

EXPOSURE HEAD, IMAGE FORMATION APPARATUS, READING HEAD, AND READING APPARATUS

CROSS REFERENCE TO RELATED APPLICATIONS

This application claims priority based on 35 USC 119 from prior Japanese Patent Application No. 2018-118961 filed on Jun. 22, 2018, entitled "EXPOSURE HEAD, IMAGE FORMATION APPARATUS, READING HEAD, AND READING APPARATUS", the entire contents of which are incorporated herein by reference.

BACKGROUND

This disclosure is related to an exposure head, an image formation apparatus, a reading head, and a reading apparatus, and is suitably applicable to an exposure head to be mounted on an electrophotographic image formation apparatus, for example.

An image formation apparatus widely diffused to date includes an exposure head to radiate exposure light emitted from light emitting diodes (LEDs) serving as light emitting elements, and is configured to print an image by forming an electrostatic latent image on a surface of a photoconductor drum by irradiating the surface of the photoconductor drum with the light from the exposure head, attaching a toner onto the electrostatic latent image, and then developing the toner image thus obtained.

An exemplary exposure head includes: a board that mounts an LED array in which LEDs are arranged in a line; a lens unit in which lenses to condense light beams emitted from the respective LEDs are arrayed; and a holder that holds the board and the lens unit (see Patent Literature 1: Japanese Patent Application Publication No. 2013-15847, for example). Here, the light beams emitted from the LED array mounted on the board are passed and converged through the lens unit and projected for exposure onto the surface of the photoconductor drum located at an image forming position of the lens unit, thus forming an electrostatic latent image on the surface.

In the above-described exposure head, a cover may be fixed to the holder with an adhesive so as to reduce dusts on the board and the lens unit.

Patent Literature 1: Japanese Patent Application Publication No. 2013-15847

SUMMARY

In the case of attaching the cover to the holder with the adhesive in the above-described exposure head, there is a demand for reducing the chance of spreading of the adhesive to a back side of the cover, which is a surface on the opposite side of an attachment surface of the cover to be attached to the holder.

An object of an aspect of one or more embodiments of this disclosure may be to propose an exposure head, an image formation apparatus, a reading head, and a reading apparatus, which can reduce the chance of spreading of an adhesive to the back side of a cover on the opposite side of an attachment surface of the cover to be attached to a holder.

A first aspect of this disclosure may be an exposure head that may include: a light emitting element board on which light emitting elements are arranged; a holder that holds the light emitting element board and is provided with an opening; a transparent cover arranged at a position to shield the opening, such that a first attachment surface of the holder is attached to a second attachment surface of the transparent cover by using an adhesive; and an optical system arranged between the light emitting element board and the transparent cover. The exposure head satisfies an expression defined as $\theta1<\theta2$, where $\theta1$ is a contact angle on the first attachment surface representing wettability of the first attachment surface, and $\theta2$ is a contact angle on the second attachment surface representing wettability of the second attachment surface.

A second aspect of this disclosure may be an image formation apparatus that may include the exposure head according to the first aspect.

A third aspect of this disclosure may be a reading head that may include: a light receiving element board on which light receiving elements are arranged; a holder that holds the light receiving element board and is provided with an opening; a transparent cover arranged at a position to shield the opening, such that a first attachment surface of the holder is attached to a second attachment surface of the transparent cover by using an adhesive; and an optical system arranged between the light receiving element board and the transparent cover. The reading head satisfies an expression defined as $\theta1<\theta2$, where $\theta1$ is a contact angle on the first attachment surface representing wettability of the first attachment surface, and $\theta2$ is a contact angle on the second attachment surface representing wettability of the second attachment surface.

A fourth aspect of this disclosure may be a reading apparatus that may include: the reading head according to the third aspect.

According to at least one of the above-described aspects, it may be possible to cause the adhesive, which is poured into a space between the first attachment surface and the second attachment surface in the course of fixing the transparent cover to the holder, to spread preferentially to an interface with the first attachment surface rather than to an interface with the second attachment surface, and thus to prevent the adhesive from spreading to a surface of the transparent cover on the opposite side of the second attachment surface.

Accordingly, this may realize the exposure head, the image formation apparatus, the reading head, and the reading apparatus, which are capable of reducing the chance of spreading of the adhesive to the back side of the transparent cover on the opposite side of the attachment surface to be attached to the holder.

DETAILED DESCRIPTION

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

1. First Embodiment (1-1. Configuration of Color Printer)

Figure 1:
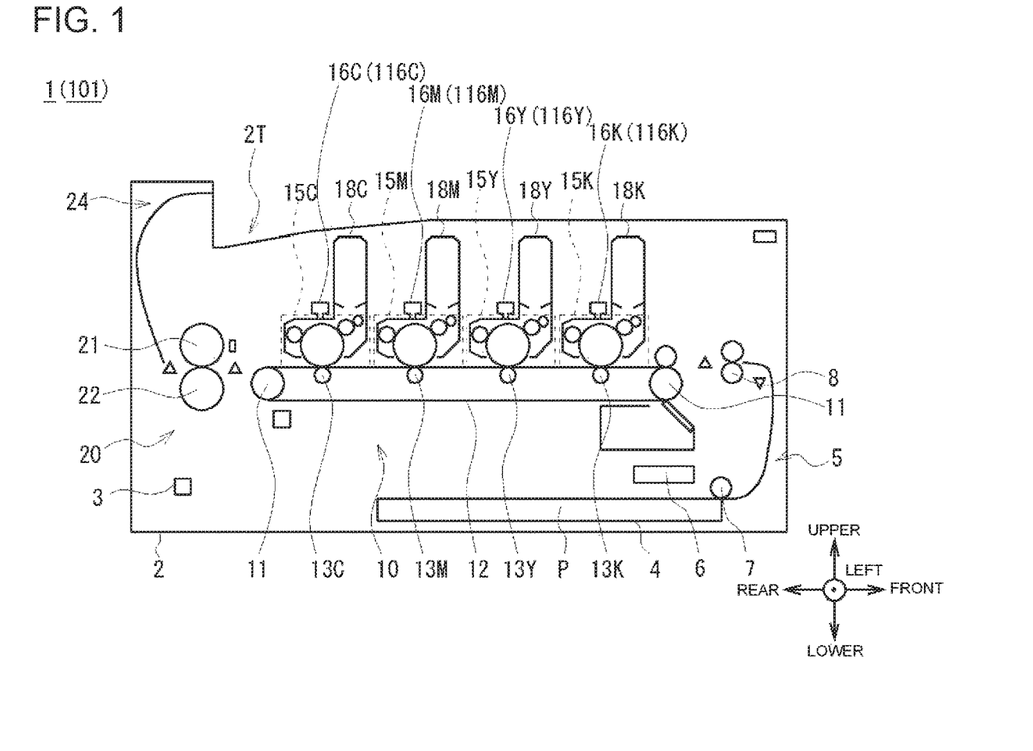
FIG. 1 is a diagram illustrating a left side view illustrating a configuration of a color printer.

As illustrated in a left side view of FIG. 1, a color printer 1 is a color electrophotographic printer that prints a desired color image on a paper sheet P having a given size such as A3 size and A4 size. In the color printer 1, various components are arranged inside a printer housing 2 that is formed substantially into a box shape. Note that the following description is made on the assumption that a right end portion in FIG. 1 is regarded as a front face of the color printer 1, and upper and lower directions, right and left directions, and front and rear directions are defined with respect to the front face, respectively. A control unit 3 performs overall control of the color printer 1. The control unit 3 is connected either wirelessly or by wire to a higher-level device (not illustrated) such as a personal computer through a not-illustrated communication processing unit. When image data representing a color image to be printed is provided from the higher-level device and printing of the color image is instructed by the higher-level device, the control unit 3 executes a printing process to form a printed image on a surface of the paper sheet P.

A paper sheet storage cassette 4 to store the paper sheets P, a sheet feeding unit 5 to feed the paper sheets P stored in a stacked state in the paper sheet storage cassette 4 separately one by one, and a paper sheet color measurement unit 6 to measure a color of each paper sheet P are provided at the lowermost part inside the printer housing 2. The sheet feeding unit 5 is located above a front end of the paper sheet storage cassette 4, and is provided with rollers such as a hopping roller 7 provided above the front end of the paper sheet storage cassette 4 with its spindle oriented in a right-left direction and registration rollers 8 provided above the hopping roller 7, as well as guide pieces to guide the paper sheets P, and so forth.

The sheet feeding unit 5 rotates the hopping roller 7, the registration rollers 8, and the like by the control of the control unit 3, thus picking up the paper sheets P stored in the paper sheet storage cassette 4 separately one by one. Moreover, the sheet feeding unit 5 moves each paper sheet P thus picked up forward and upward, and then moves the paper sheet P to turn back at a position substantially at the vertical center in the vicinity of the front end inside the printer housing 2. Meanwhile, the paper sheet color measurement unit 6 measures the color of each paper sheet P and sends a result of the measurement to the control unit 3.

A transfer belt unit 10 is provided above the paper sheet storage cassette 4 inside the printer housing 2 in such a way as to cross a substantial part of the inside of the printer housing 2 in a front-rear direction. The transfer belt unit 10 is provided with two rollers 11 each formed into an elongated cylindrical shape with its spindle oriented in the right-left direction and located at the front and back, respectively. Moreover, a transfer belt 12 extends in such a way as to go around the front and back rollers 11. The transfer belt 12 is formed into an endless belt with a large width in the right-left direction, and travels along with the rotation of the rollers 11. The transfer belt unit 10 moves the transfer belt 12 by rotating the rollers 11 based on the control of the control unit 3, and conveys each paper sheet P received from the sheet feeding unit 5 rearward while placing the paper sheet P on an upper surface of the transfer belt 12.

Figure 2:
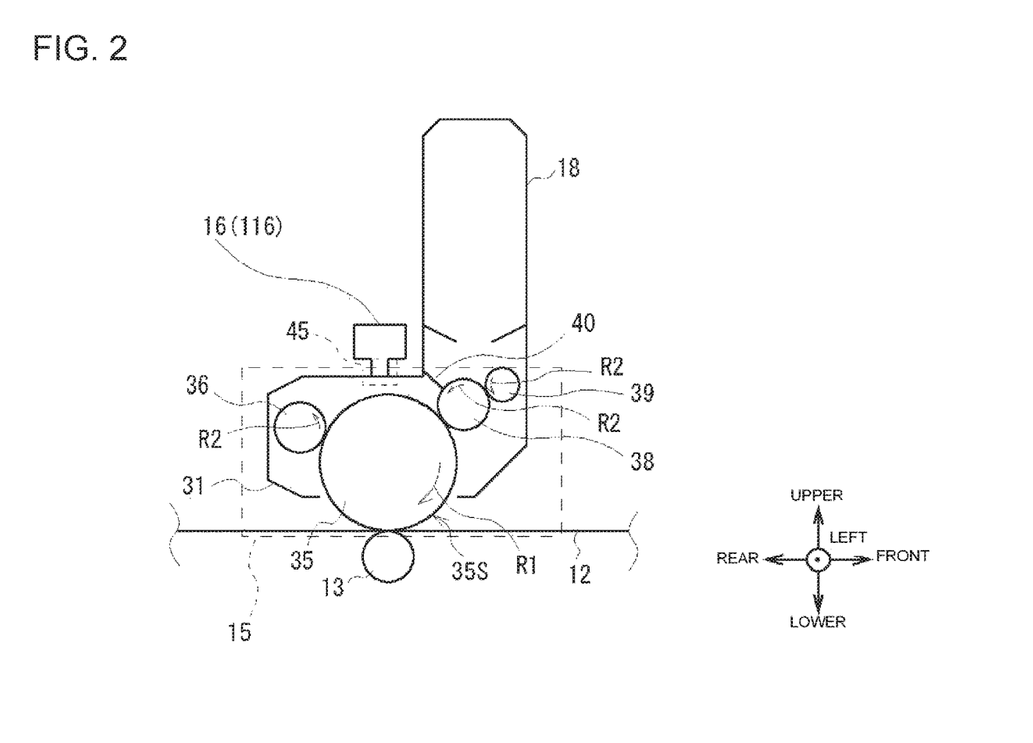
FIG. 2 is a diagram illustrating a left side view illustrating a configuration of an image formation unit.

In the meantime, four image formation units 15C, 15M, 15Y, and 15K (hereinafter also collectively referred to as image formation units 15) illustrated in FIG. 2 are arranged in sequence from a back side to a front side on an upper side of the transfer belt unit 10, namely, at a section of the printer housing 2 above the center thereof. In other words, the image formation units 15 for the respective colors are arranged in a so-called tandem fashion. The image formation units 15C, 15M, 15Y, and 15K correspond to colors of cyan (C), magenta (M), yellow (Y), and black (K), respectively. Moreover, the image formation units 15C, 15M, 15Y, and 15K have the same configuration and only the corresponding colors of the toners therein are different from one another. Each of the image formation units 15 is formed substantially into a box shape which is relatively long in the right-left direction so as to deal with the right-left width of the paper sheets P.

Meanwhile, LED heads 16C, 16M, 16Y, and 16K (hereinafter also collectively referred to as LED heads 16) are provided inside the printer housing 2 so as to correspond to the image formation units 15C, 15M, 15Y, and 15K, respectively. Each of the LED heads 16 is formed into a rectangular parallelepiped shape that is elongate in the right-left direction, and LEDs are arranged in the inside thereof along the right-left direction. The LED head 16 causes the LEDs to emit light beams in a light emission pattern in accordance with the image data provided from the control unit 3. The image formation units 15 are brought extremely close to the LED heads 16 when the image formation units 15 are attached to the printer housing 2, and an exposure process takes place by using the light beams from the LED heads 16.

Moreover, toner cartridges 18C, 18M, 18Y, and 18K (hereinafter also collectively referred to as toner cartridges 18) are connected to upper parts of the image formation units 15C, 15M, 15Y, and 15K, respectively. Each of the toner cartridges 18 is a hollow container which is elongate in the right-left direction. The toner of the corresponding color in the form of powder is contained and a given stirring mechanism is embedded in each toner cartridge 18. Transfer rollers 13C, 13M, 13Y, and 13K (hereinafter also collectively referred to as transfer rollers 13) serving as transfer members are provided to the transfer belt unit 10 at four positions immediately below the respective image formation units 15 located between the front and back rollers 11. In other words, an upper part of the transfer belt 12 is sandwiched between the respective image formation units 15 and the respective transfer rollers 13. Each transfer roller 13 is configured to be chargeable.

The control unit 3 supplies the toners from the toner cartridges 18 to the image formation units 15. At the same time, the control unit 3 causes the LED heads 16 to emit the light so as to form the light emission patterns corresponding to the image data supplied from the higher-level device (not illustrated). In response thereto, the respective image formation units 15 form the toner images corresponding to the light emission patterns from the LED heads 16 by using the toners supplied from the toner cartridges 18, and transfer the toner images onto the paper sheet P, respectively (more details to be described later). Thus, the toner images of the four colors corresponding to the image data are sequentially transferred onto the paper sheet P being conveyed by the transfer belt unit 10.

A fixation unit 20 or a fixation part is provided at the rear of the transfer belt unit 10, that is, in the vicinity of the vertical center near a rear end of the printer housing 2. The fixation unit 20 includes a heating roller 21 and a pressing roller 22. The heating roller 21 is formed into a cylindrical shape with its spindle oriented in the right-left direction, and is provided with a heater inside thereof. The pressing roller 22 is formed into a cylindrical shape which is similar to the heating roller 21, and is designed to press its upper surface against a lower surface of the heating roller 21 at a predetermined pressure. The fixation unit 20 heats the heating roller 21 and rotates the heating roller 21 and the pressing roller 22 in predetermined directions, respectively, based on the control by the control unit 3. Thus, the fixation unit 20 applies the heat and the pressure to the paper sheet P delivered from the transfer belt unit 10, namely, the paper sheet P on which the toner images of the four colors are superposed so as to fuse and fix the toners, and then delivers the paper sheet P upward and rearward.

A sheet discharge unit 24 is provided above and at the rear of the fixation unit 20. The sheet discharge unit 24 is formed by a combination of rollers (not illustrated) each with its spindle oriented in the right-left direction, guide pieces to guide the paper sheets, and the like. The sheet discharge unit 24 rotates the rollers as appropriate in accordance with the control by the control unit 3. Thus, the sheet discharge unit 24 conveys each paper sheet P, which is received from the fixation unit 20, upward and rearward and then turns back the paper sheet P forward, thereby discharging the paper sheet P onto a discharge tray 2T formed on an upper surface of the printer housing 2.

As described above, when the color printer 1 executes the printing process, the image formation units 15 for the respective colors form the respective toner images by causing the LED heads 16 to emit the light beams, and the toner images are sequentially transferred onto the paper sheet P.

(1-2. Configuration of Image Formation Unit)

Next, a configuration of each image formation unit 15 is described. As illustrated in FIG. 2, a frame 31 encloses a substantial part on the outer periphery of the image formation unit 15 and thus defines a relatively large space therein.

A photoconductor drum 35 as an image carrier is provided at a lower part at the center in the image formation unit 15. The photoconductor drum 35 is formed into a cylindrical shape with its spindle oriented in the right-left direction, and is rotatably supported by the frame 31 through this spindle as the center. Incidentally, the photoconductor drum 35 is rotated in a direction of an arrow R1 by transmission of a drive force from a not-illustrated motor.

A portion of the frame 31 located near a lower surface of the photoconductor drum 35 is open over a relatively wide range. For this reason, the image formation unit 15 brings the lower surface of the photoconductor drum 35 into contact with either the transfer belt 12 or the paper sheet P placed on the transfer belt 12 when the image formation unit 15 is attached to the printer housing 2 (FIG. 1). In the meantime, an exposure hole which is elongate in the right-left direction is drilled in a portion of the frame 31 located immediately above the photoconductor drum 35.

A charge roller 36 formed into a cylindrical shape with a smaller diameter than that of the photoconductor drum 35 is provided above and at the rear of the photoconductor drum 35. The charge roller 36 is made of a semiconductive elastic material, for example. Moreover, a peripheral side surface of the charge roller 36 is brought into contact with a peripheral side surface 35S of the photoconductor drum 35. Thus, the charge roller 36 uniformly charges a position of contact on the peripheral side surface 35S.

A development roller 38 formed into a cylindrical shape with a smaller diameter than that of the photoconductor drum 35 is provided above and at the front of the photoconductor drum 35. The development roller 38 as a development member is made of semiconductive urethane rubber of which electric resistance is appropriately adjusted by adding a conductive substance such as carbon to a urethane rubber material, for example. Hence, the development roller 38 is chargeable. A rear side of a peripheral side surface of the development roller 38 is brought into contact with the peripheral side surface 35S of the photoconductor drum 35. Moreover, a front side of the peripheral side surface of the development roller 38 is brought into contact with a supply roller 39 that is formed into a cylindrical shape with its diameter slightly smaller than that of the development roller 38. The supply roller 39 is made of foamed semiconductive silicone sponge, for example.

A development blade 40 in a shape of a thin plate is provided above and at the rear of the development roller 38. The development blade 40 is made of any of a metal such as stainless steel and phosphor bronze, a rubber material such as silicone rubber, and so forth. An upper rear end of the development blade 40 is fixed to the inside of the frame 31 whereby a small clearance is formed between a lower front end of the development blade 40 and the peripheral side surface of the development roller 38.

Moreover, spacers 45 are provided on right and left sides above the photoconductor drum 35. Sizes and positions to be fitted to the frame 31, and other features of the spacers 45 are optimized. By bringing a lower surface of the LED head 16 into contact with upper surfaces of the spacers 45, an interval between the peripheral side surface of the photoconductor drum 35 and the LED head 16 is adjusted to a desired length.

When the image is printed on the paper sheet P by using the above-described configuration, the image formation unit 15 rotates the photoconductor drum 35 in a direction of an arrow R1 and rotates the charge roller 36, the development roller 38, and the supply roller 39 in directions of arrows R2, and further charges the charge roller 36 and the development roller 38 based on the control by the control unit 3.

An upper rear part of the peripheral side surface 35S of the photoconductor drum 35 is first uniformly charged by the charge roller 36, and the photoconductor drum 35 is rotated in the direction of the arrow R1 so as to cause the charged part to reach the neighborhood of an upper end of the photoconductor drum 35 and to face the LED head 16. In this instance, the peripheral side surface 35S of the photoconductor drum 35 is exposed to the light beams of the light emission pattern corresponding to the image data which are emitted from the LED head 16. Thus, the electrostatic latent image corresponding to the image data is formed on the peripheral side surface 35S.

In the meantime, the toner supplied from the toner cartridge 18 is attached via the supply roller 39 to a peripheral side surface of the development roller 38 rotated in the direction of the arrow R2. Then, the excess toner is scraped off by the development blade 40. Accordingly, the toner attached to the peripheral side surface is formed into a thin uniform film.

The photoconductor drum 35 is further rotated in the direction of the arrow R1, whereby the toner that is formed into the thin film shape on the peripheral side surface of the development roller 38 is attached only to locations on the peripheral side surface 35S corresponding to the electrostatic latent image in the vicinity of its front end in contact with the development roller 38. Thus, the toner image corresponding to the image data is formed on the peripheral side surface 35S of the photoconductor drum 35. Note that the toner image formed on the peripheral side surface 35S in this instance is an image that represents a component of only one of the colors (namely, any one of cyan, magenta, yellow, and black) handled by the particular image formation unit 15 out of an image to be printed in the end.

Thereafter, the photoconductor drum 35 is further rotated in the direction of the arrow R1 so as to cause the toner image to reach the neighborhood of a lower end of the photoconductor drum 35. In this instance, the control unit 3 causes the paper sheet P to reach a position below the image formation unit 15 by using the transfer belt unit 10 (FIG. 1), and charges the transfer roller 13 with opposite polarity to that of the toner. In this way, the image formation unit 15 sandwiches the paper sheet P between the portion of the photoconductor drum 35 on which the toner image is formed and the charged transfer roller 13, thereby transferring the toner image onto the paper sheet P. Incidentally, if the toner remains on the peripheral side surface 35S of the photoconductor drum 35 after the transfer of the toner image onto the paper sheet P, the remaining toner is removed by a not-illustrated cleaning device.

In this way, the image formation unit 15 brings the LED head 16 face-to-face closely to the photoconductor drum 35 and forms the toner image on the peripheral side surface 35S thereof by an exposure action of the LED head 16.

(1-3. Configuration of LED Head)

Figure 3A:
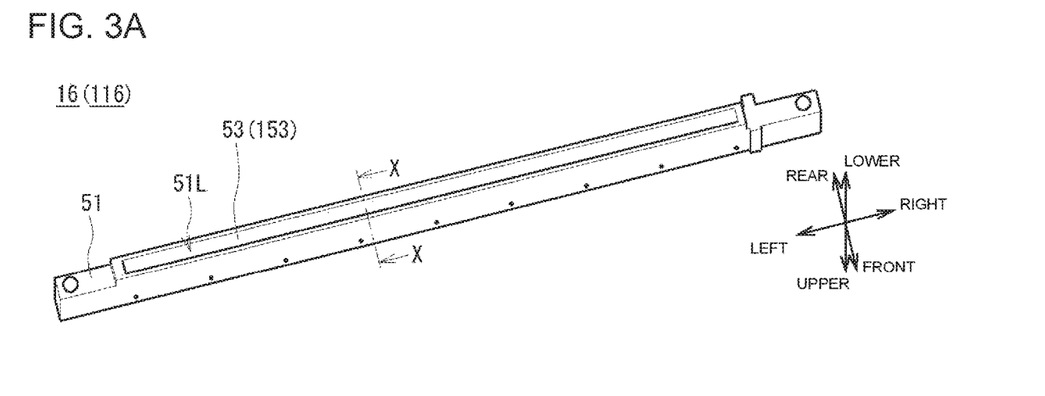
FIGS. 3A and 3B are diagrams illustrating perspective views (part 1) of a configuration of an LED head.
Figure 3B:
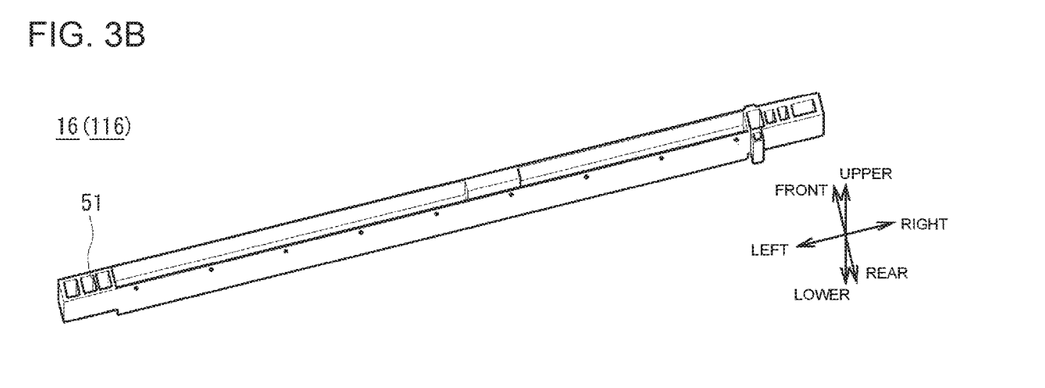
Figure 4:
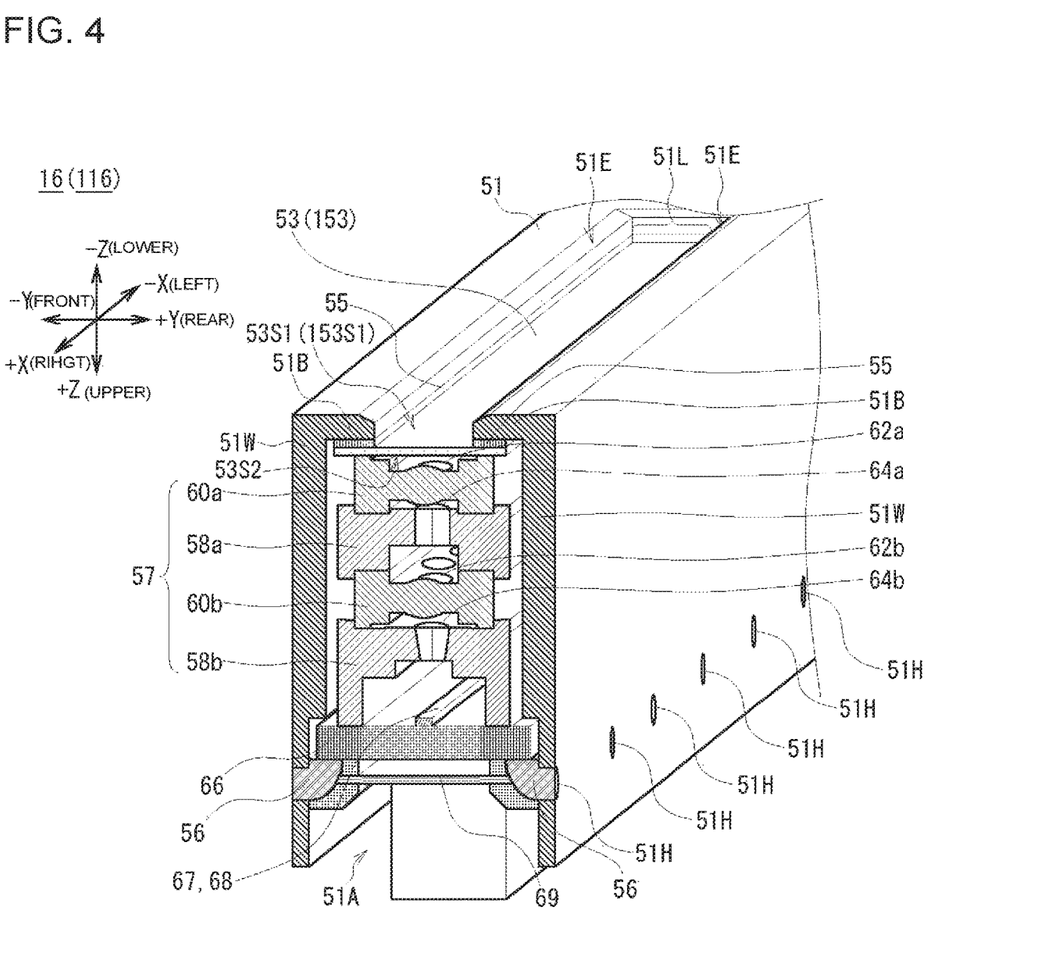
FIG. 4 is a diagram illustrating a cross-sectional view (part 2) of the configuration of the LED head, which is taken along the X-X line in FIG. 3A and viewed in the direction of the arrows.

Next, a configuration of each LED head 16 is described. As illustrated in FIGS. 3A, 3B and 4, the LED head 16 is formed into the rectangular parallelepiped shape that is elongate in the right-left direction as a whole, and is configured such that a cover member 53, a lens unit 57, a board 66, and the like are stacked on a holder 51. Note that FIG. 3A illustrates a perspective view of the LED head 16 viewed from a lower front side, FIG. 3B illustrates a perspective view of the LED head 16 viewed from an upper rear side, and FIG. 4 illustrates a cross-sectional view taken along the X-X line in FIG. 3A and viewed in the direction of the arrows. In the following, a lower direction indicated in FIG. 4 is also referred to as an emission direction while an upper direction indicated therein is also referred to as a counter-emission direction. Moreover, in the following, a right-left direction indicated in FIG. 4 is also referred to as a longitudinal direction (a direction of arrangement, a main scanning direction), a front-rear direction indicated therein which intersects with the right-left direction is also referred to as a sub-scanning direction, and an up-down direction indicated therein is also referred to as a direction of the optical axis. Furthermore, the right-left direction being the direction of arrangement of an LED array 67 is defined as an x direction, the up-down direction being the direction of optical axes of lens arrays 60 is defined as a z direction, and the front-rear direction being a direction orthogonal to the x direction and the z direction is defined as a y direction.

(1-3-1. Configuration of Holder)

Figure 6:
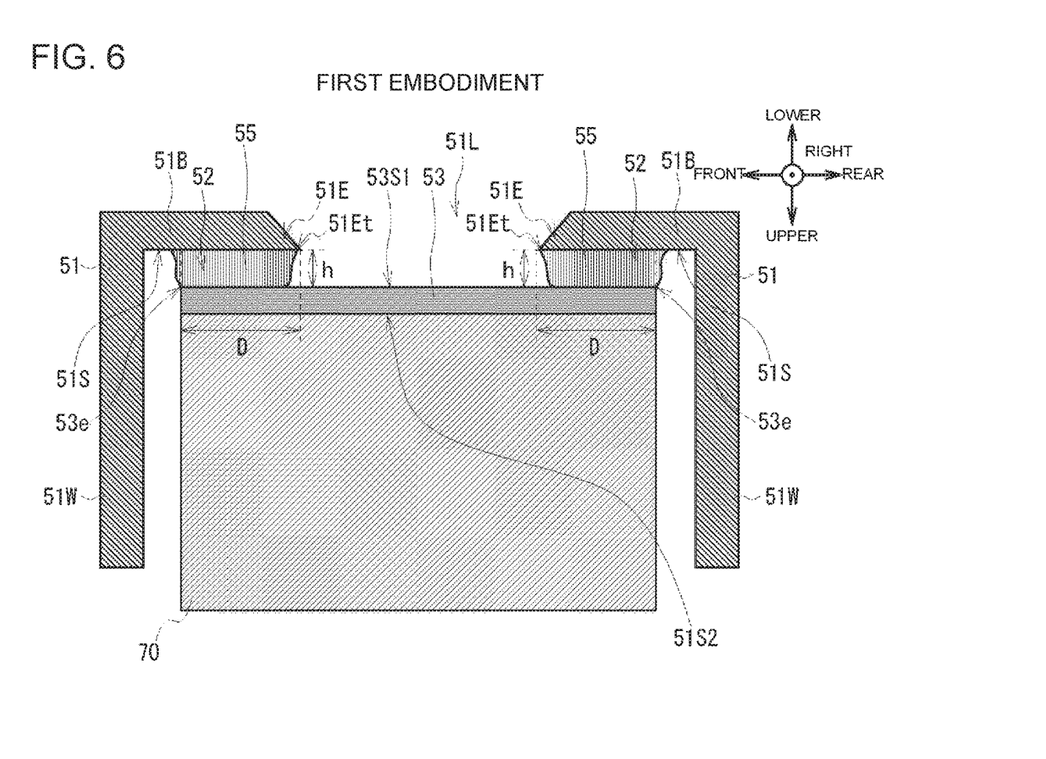
FIG. 6 is a diagram illustrating a cross-sectional view of a configuration at the time of attachment of a cover member according to a first embodiment, which is taken along the X-X line in FIG. 3A and viewed in the direction of the arrows.

The holder 51 is formed by molding a liquid crystal polymer, for example. On the whole, the holder 51 has such a shape obtained by removing a side face on the counter-emission direction side from a hollow rectangular prism formed along the right-left direction. The holder 51 has a U-shaped cross-section. In the meantime, the holder 51 is mainly formed from a bottom part 51B having a plate shape that is elongate in the right-left direction and thin in the up-down direction. Moreover, side parts 51W each having a plate shape that is elongate in the right-left direction and thin in the front-rear direction extend upward from front and rear sides of the bottom part 51B, respectively. Moreover, a holder opening 51A is formed as an open upper end part. A hole portion 51L in a shape of a slit which is elongate in the right-left direction is drilled substantially at the center in the front-rear direction of the bottom part 51B in such a way as to penetrate the bottom part 51B in the up-down direction. As a consequence, a hole peripheral edge portion 51E is formed over the entire periphery of the hole portion 51L in the bottom part 51B of the holder 51, and a hole peripheral edge tip portion 51Et (FIG. 6) is formed at a tip end of the hole peripheral edge portion 51E. Meanwhile, a cover-opposing surface 51S (FIG. 6) being a flat surface extending in the front-rear direction as well as the right-left direction is formed on the counter-emission direction side of the bottom part 51B constituting an upper surface thereof. Pores 51H are provided in each side part 51W at regular intervals in the right-left direction in such a way as to penetrate the side part 51W from the outside to the inside thereof at locations slightly on an upper side from a position in the up-down direction where the side part 51W is aligned with the board 66. Note that FIG. 6 illustrates a state of attaching and fixing the cover member 53 to the holder 51 in the course of manufacturing the LED head 16.

(1-3-2. Configuration of Cover Member)

The cover member 53 is made of a transparent resin film, for example. The cover member 53 is formed into the plate shape that is elongate in the right-left direction and thin in the up-down direction, and is fixed to the bottom part 51B of the holder 51 by using an adhesive 55. Meanwhile, a holder-opposing surface 53S1 being a flat surface of the cover member 53 extending in the front-rear direction as well as the right-left direction and in parallel to the cover-opposing surface 51S of the bottom part 51B of the holder 51 (FIG. 6) is formed on the emission direction side of the cover member 53 constituting a lower surface thereof to be opposed to the cover-opposing surface 51S. As illustrated in FIG. 6, a clearance 52 having a length in the up-down direction equivalent to a height h is defined between the holder-opposing surface 53S1 of the cover member 53 and the cover-opposing surface 51S of the holder 51. The adhesive 55 is injected into the clearance 52 so as to fill this gap. Thus, in the LED head 16, the cover member 53 is fixed to the holder 51 such that the cover-opposing surface 51S and the holder-opposing surface 53S1 are opposed to each other in the up-down direction. Accordingly, the adhesive 55 is in contact with both the cover-opposing surface 51S of the holder 51 and the holder-opposing surface 53S1 of the cover member 53. Meanwhile, a distance in the front-rear direction being a surface direction of the cover member 53 from the hole peripheral edge tip portion 51Et serving as an open end portion of the holder 51 to a cover member end portion 53e, which is an end portion of the cover member 53 coming close to the side part 51W of the holder 51, has a length D.

The cover member 53 is fixed to the holder 51 in a manufacturing process of the LED head 16 by pouring the adhesive 55 being an ultraviolet-curable resin based on a liquid acrylic resin with a low viscosity of 300 [mPa·s] or below into the clearance 52, and thus filling the entire periphery of the clearance 52 with the adhesive 55 by using a capillary action. A lens-opposing surface 53S2 of the cover member 53 being a surface on the opposite side of the holder-opposing surface 53S1 serves as a reference in position in the z direction when the lens unit 57 and the board 66 are arranged in the holder 51. Thus, the lens-opposing surface 53S2 functions as a reference surface. Note that the viscosity of the adhesive 55 may be not more than 300 [mPa·s] and not less than 10 [mPa·s]. When the viscosity of the adhesive is less than 10 [mPa·s], the adhesive may hardly move further into the clearance 52 between the surfaces 53S and 51S of the cover member 53 and the holder 51.

(1-3-3. Configuration of Lens Unit)

The lens unit 57 with its longitudinal direction aligned with the right-left direction is fitted above the cover member 53 in such a way as to be stacked on the cover member 53. In other words, the lens unit 57 is arranged adjacent to the lens-opposing surface 53S2, and a lens array 60a to be described later is arranged in contact with the lens-opposing surface 53S2 of the cover member 53. The lens unit 57 has a configuration in which the lens array 60a, a light shielding member 58a, a lens array 60b, and a light shielding member 58b are stacked in sequence in the z direction from a −z direction side representing a negative side in the z direction to a +z direction side representing a positive side in the z direction. In the following, the lens arrays 60a and 60b are also collectively referred to as the lens arrays 60 and the light shielding members 58a and 58b are also collectively referred to as the light shielding members 58.

On the whole, the lens array 60a serving as a first lens array includes microlenses 62a as first lenses each having a substantially circular shape, which are arranged in two rows substantially linearly and parallel to each other along the direction of arrangement being the x direction. Here, positions of each pair of the microlenses 62a contiguous in the x direction are displaced from each other in the y direction. Thus, in the lens array 60a, the microlenses 62a are arranged zigzag, that is, in a staggered manner alternately in two rows that are substantially linear and parallel to each other. The microlenses 62a are made of a material that transmits light beams from LED elements 68. A lens optical axis representing the optical axis of light transmitted through each microlens 62a is located at the center of the microlens 62a.

On the whole, the lens array 60b serving as a second lens array includes microlenses 62b as second lenses each having a substantially circular shape being the same shape as those in the lens array 60a, which are arranged in two rows substantially linearly and parallel to each other along the direction of arrangement being the x direction. Here, positions of each pair of the microlenses 62b contiguous in the x direction are displaced from each other in the y direction. Thus, in the lens array 60b, the microlenses 62b are arranged zigzag, that is, in a staggered manner alternately in two rows that are substantially linear and parallel to each other. The microlenses 62b are made of a material that transmits the light beams from the LED elements 68. A lens optical axis representing the optical axis of light transmitted through each microlens 62b is located at the center of the microlens 62b.

The lens array 60a and the lens array 60b are arranged such that the lens optical axis of each microlens 62a and the lens optical axis of the corresponding microlens 62b coincide with each other. In the following, the microlenses 62a and 62b are also collectively referred to as the microlenses 62.

On the whole, the light shielding member 58a serving as a first light shielding member includes openings 64a as apertures each having a substantially columnar shape, which are arranged in two rows substantially linearly and parallel to each other along the direction of arrangement being the x direction. Here, positions of each pair of the openings 64a contiguous in the x direction are displaced from each other in the y direction. Thus, in the light shielding member 58a, the openings 64a are arranged zigzag, that is, in a staggered manner alternately in two rows that are substantially linear and parallel to each other. The light shielding member 58a is made of polycarbonate and formed by injection molding, and shields the light beams from the LED elements 68. Each opening 64a is formed as a through hole that transmits the light beam from the corresponding LED element 68 in such a way as to conform to layouts of the corresponding microlens 62a of the lens array 60a and of the corresponding microlens 62b of the lens array 60b. The center (that is, the gravity center) of the opening 64a constitutes the aperture center.

On the whole, the light shielding member 58b serving as a second light shielding member includes openings 64b as apertures each having a substantially columnar shape, which are arranged in two rows substantially linearly and parallel to each other along the direction of arrangement being the x direction. Here, positions of each pair of the openings 64b contiguous in the x direction are displaced from each other in the y direction. Thus, in the light shielding member 58b, the openings 64b are arranged zigzag, that is, in a staggered manner alternately in two rows that are substantially linear and parallel to each other. The light shielding member 58b is made of polycarbonate and formed by injection molding, and shields the light beams from the LED elements 68. Each opening 64b is formed as a through hole that transmits the light beam from the corresponding LED element 68 in such a way as to conform to layouts of the corresponding microlens 62a of the lens array 60a and of the corresponding microlens 62b of the lens array 60b. The center (that is, the gravity center) of the opening 64b constitutes the aperture center.

The light shielding member 58a and the light shielding member 58b are arranged such that the aperture centers of the openings 64a coincide with the aperture centers of the openings 64b. In the following, the openings 64a and 64b are also collectively referred to as the openings 64.

As described above, the light shielding member 58a and the light shielding member 58b are formed at such positions that the openings 64a and the openings 64b correspond to the microlenses 62a and the microlenses 62b of the lens array 60a and the lens array 60b. The light beams emitted from the LED array 67 to be described later are converged by the lens unit 57, thus effecting exposure of the charged photoconductor drum 35 (FIG. 2) to form the electrostatic latent image thereon.

(1-3-4. Configuration of Board)

The board 66 with its longitudinal direction aligned with the right-left direction is fitted above the lens unit 57 in the holder 51. The board 66 is made of a so-called glass epoxy board and formed into a thin plate shape that is elongate in the right-left direction and thin in the up-down direction, and has a configuration in which wiring layers provided with given wiring patterns are stacked in the up-down direction. The LED array 67 is mounted substantially at the center in the front-rear direction on the emission direction side being a lower surface of the board 66 and along the longitudinal direction of the board 66 in such a way as to be opposed to the lens unit 57. The LED elements 68 configured to emit the light beams downward are arranged on the LED array 67 at predetermined fine intervals along the direction of arrangement which is the right-left direction.

In this way, the LED head 16 forms the electrostatic latent image at a resolution of 600 [dpi] on the peripheral surface of the photoconductor drum 35 (FIG. 2). Since the LED head 16 has the resolution of 600 [dpi] in an embodiment, 600 LED elements 68 are arranged per inch. In other words, the LED elements 68 are arranged at intervals of 0.0423 [mm] each in the x direction.

The board 66 is fixed to the holder 51 by injecting an adhesive 56 into an upper surface at front and rear end portions of the board 66 through the pores 51H in the holder 51. Moreover, the LED head 16 thus seals a gap between the holder 51 and the board 66 and substantially seals up a space surrounded by the bottom part 51B of the holder 51, the front and rear side parts 51W, and the lower surface of the board 66, thereby avoiding invasion of this space by foreign substances.

Exposure of the board 66 to the outside is prevented by covering the entire surface on the counter-emission direction side of the board 66 with an insulating sheet 69. The insulating sheet 69 is formed from an insulating material made of polyester such as a Mylar (a registered trademark) sheet. The insulating sheet 69 is formed into a film that is long in the right-left direction and is thin in the up-down direction with its width in the front-rear direction smaller than that of the board 66.

(1-4. Concerning Contact Angles)

Here, when a contact angle of the adhesive 55 on the cover-opposing surface 51S of the holder 51 is defined as a contact angle $\theta 1$ and a contact angle of the adhesive 55 on the holder-opposing surface 53S1 of the cover member 53 is defined as a contact angle $\theta 2$, the contact angles are set to satisfy the contact angle $\theta 1$<the contact angle $\theta 2$ in the case of the LED head 16. To be more precise, the contact angle $\theta 1$ is set to an angle smaller by 5 [°] or above than the contact angle $\theta 2$. In other words, a difference between the contact angle $\theta 1$ and the contact angle $\theta 2$ is set equal to or above 5 [°]. The contact angles $\theta 1$ and $\theta 2$ represent contact angles in the case of using the adhesive 55 having the viscosity of 300 [mPa·s] or below.

As a consequence, when the adhesive 55 is discharged to a space between the cover-opposing surface 51S and the holder-opposing surface 53S1 at the time of fixing the cover member 53 to the holder 51, the adhesive 55 preferentially spreads to an interface with the cover-opposing surface 51S rather than to an interface with the holder-opposing surface 53S1.

Figure 7:
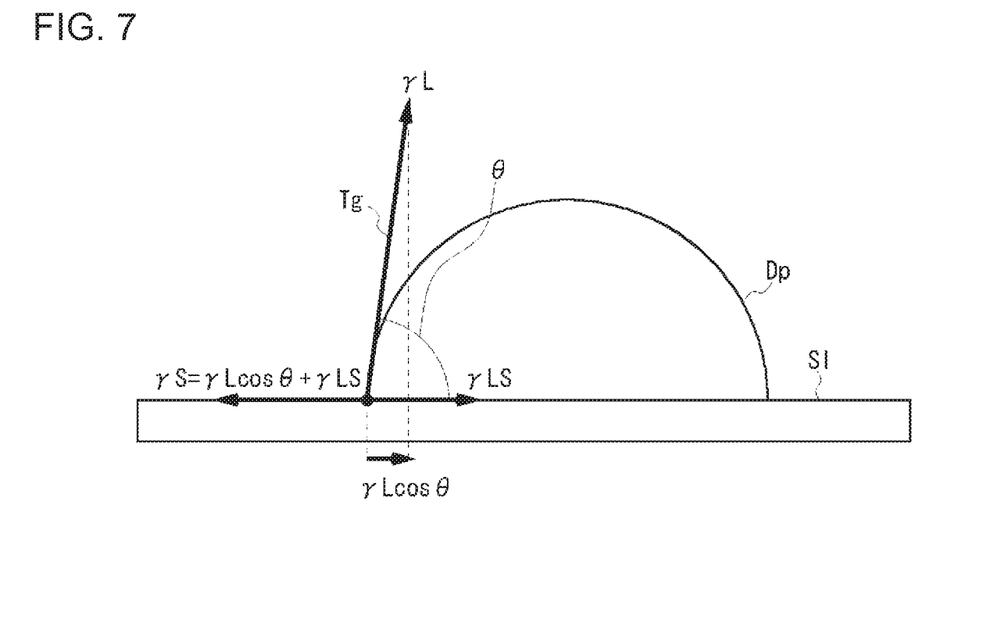
FIG. 7 is a diagram illustrating a contact angle.

Here, the contact angle is a quantitative representation of the degree of wetting to be defined by an angle formed between a liquid surface and a solid surface at a location where a free surface of a stationary liquid comes into contact with a solid wall. Specifically, as illustrated in FIG. 7, the contact angle $\theta$ is an angle formed between a tangent Tg of a liquid droplet Dp and a surface of a solid Sl, and has a value in a range from 0 [°] to 180 [°]. It is deemed to be more wettable (less repellent) when the contact angle $\theta$ gets closer to 0 [°]. On the other hand, it is deemed to be less wettable (more repellent) as the contact angle $\theta$ gets closer to 180 [°]. Meanwhile, assuming that a surface tension of the liquid droplet Dp is $\gamma L$, a surface tension of the solid Sl is $\gamma S$, and an interfacial tension between the liquid droplet Dp and the solid Sl is $\gamma LS$, a relation of $\gamma S=\gamma L \cos \theta+\gamma LS$ holds true.

Figure 14:
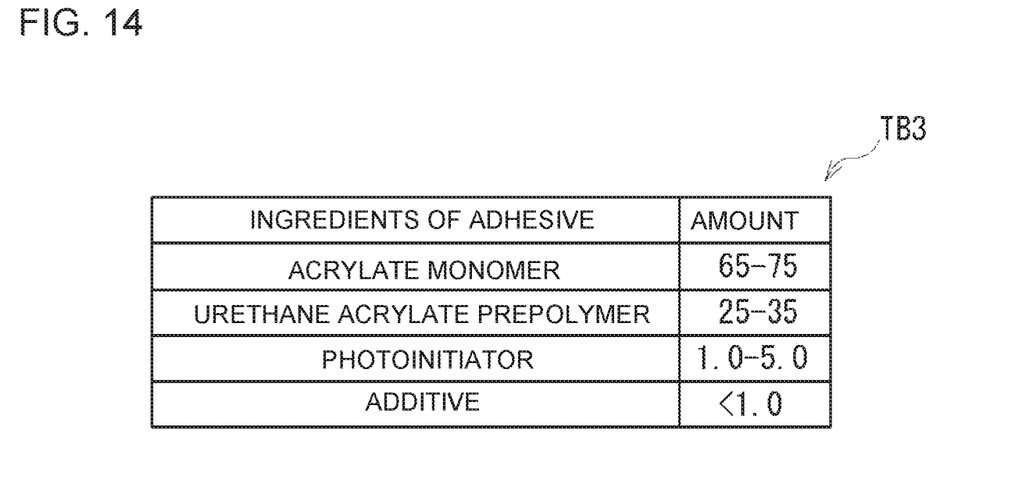
FIG. 14 is a table listing ingredients of an adhesive.

Ingredients of the adhesive 55 are listed in a table TB3 in FIG. 14. The adhesive 55 mainly contains an acrylate monomer, a urethane acrylate prepolymer, a photoinitiator, and an additive. For example, the type of the additive may be changed in order to adjust the contact angle. In order to reduce the contact angle of the adhesive 55 (to increase the wettability), for instance, a surfactant may be used as the additive.

(1-5. Method of Attaching Cover Member)

Figure 5:
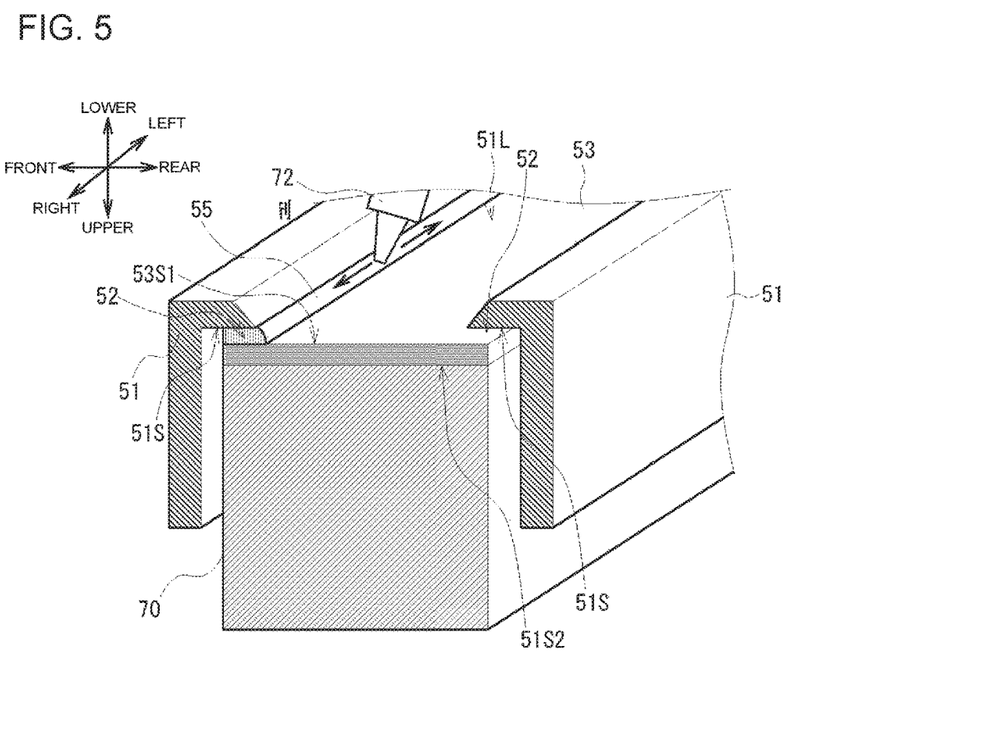
FIG. 5 is a diagram illustrating a cross-sectional view, for explaining a method of attaching a cover member, taken along the X-X line in FIG. 3A and viewed in the direction of the arrows.

FIGS. 5 and 6 illustrate a method of attaching the cover member 53 to the holder 51. First, the cover member 53 that defines a reference position in the up-down direction of the lens unit 57 (FIG. 4) is suctioned to an attachment jig 70 formed with a high degree of flatness along the right-left direction. The holder 51 is set such that the cover-opposing surface 51S is opposed to the cover member 53 in the up-down direction and that the clearance having the height h in the up-down direction is provided between the holder-opposing surface 53S1 and the cover-opposing surface 51S. Then, the low-viscosity adhesive 55 having the viscosity $\mu \leq 300$ [mPa·s] is discharged from a dispenser 72. The dispenser 72 pours the adhesive 55 into the entire periphery of the clearance 52, thus filling the entire periphery of the clearance 52 with the adhesive 55 by using the capillary action. After the adhesive 55 is discharged, the cover member 53 is pressed against the holder 51 by using the attachment jig 70 until the adhesive 55 is cured. Thus, the cover member 53 is fixed to the entire periphery of the hole peripheral edge portion 51E of the holder 51 with the adhesive 55.

Subsequently, in the LED head 16, the lens unit 57 and the board 66 are pressed downward to the cover member 53 by using a not-illustrated attachment jig, and then the board 66 is fixed to the holder 51 as a consequence of injecting the adhesive 56 (FIG. 4) from the outside of the pores 51H in the holder 51. Thus, the LED head 16 is fixed in such a way as to stack the cover member 53, the lens unit 57, and the board 66 on the holder 51.

As described above, the LED head 16 is set to satisfy the contact angle $\theta 1$<the contact angle $\theta 2$. Accordingly, the adhesive 55 is inhibited from spreading to the attachment jig 70 side and is allowed to preferentially spread to the holder 51 side instead.

From a geometrical point of view, the following expression 1 is preferably satisfied in order to set the space between the cover-opposing surface 51S and the holder-opposing surface 53S1 equal to the height h so as not to cause the adhesive 55 poured as illustrated in FIG. 6 to spread toward the hole portion 51L of the holder 51:

$$\theta 2, \theta 1 > 2\tan^{-1}\left(\frac{2h}{D}\right). \tag{1}$$

Meanwhile, in order to use the capillary action, at least the cover-opposing surface 51S needs to be hydrophilic ($\theta 1$<90 [°]). Moreover, if a surface tension that acts on an interface between the adhesive 55 and air is defined as a surface tension $\gamma$, then a sum in a horizontal direction of a force that acts on the interface with the cover-opposing surface 51S and a force that acts on the interface with the holder-opposing surface 53S1 needs to be directed to an outer side of the fluid of the adhesive 55 (that is, in such a direction to spread into the clearance 52 toward the side part 51W). As a consequence, the following expressions 2 and 3 need to be satisfied:

$$\gamma \cos \theta_1 + \gamma \cos \theta_2 > 0 \qquad (2); \text{ and}$$

$$\theta_2 < 180° - \theta_1 [\text{deg.}] \qquad (3).$$

The following expression 4 is derived from these expressions by coordinating the conditions applicable to the respective contact angles:

$$\theta_1 < \theta_2 < 180° - \theta_1 [\text{deg.}] \qquad (4).$$

Figure 8:
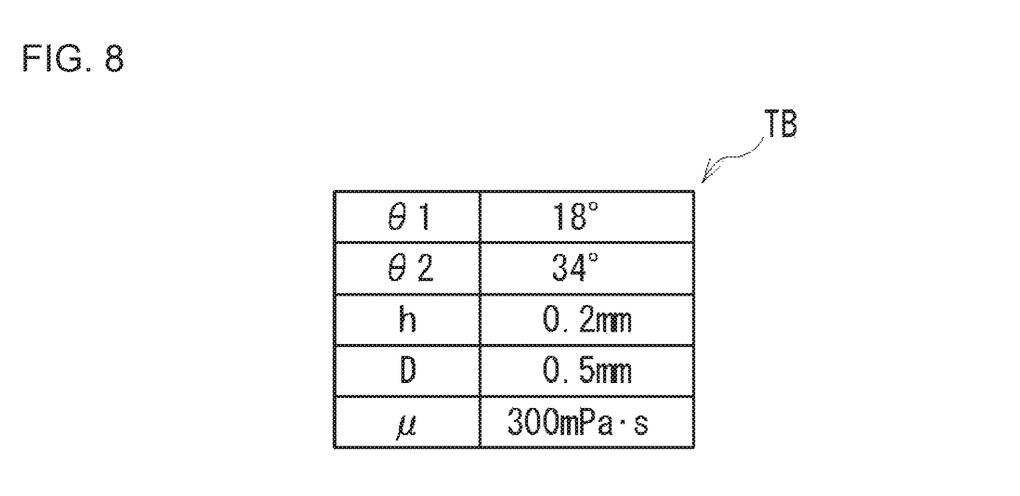
FIG. 8 is a table listing parameters.

Here, parameters listed in a parameter table TB in FIG. 8 are set to the LED head 16 of an embodiment. Specifically, the LED head 16 is set to have the contact angle $\theta_1$ of 18 [°], the contact angle $\theta_2$ of 34 [°], the height h of 0.2 [mm], the length D of 0.5 [mm], and the viscosity $\mu$ of 300 [mPa·s], respectively.

(1-6. Operation and Effects)

Figure 9:
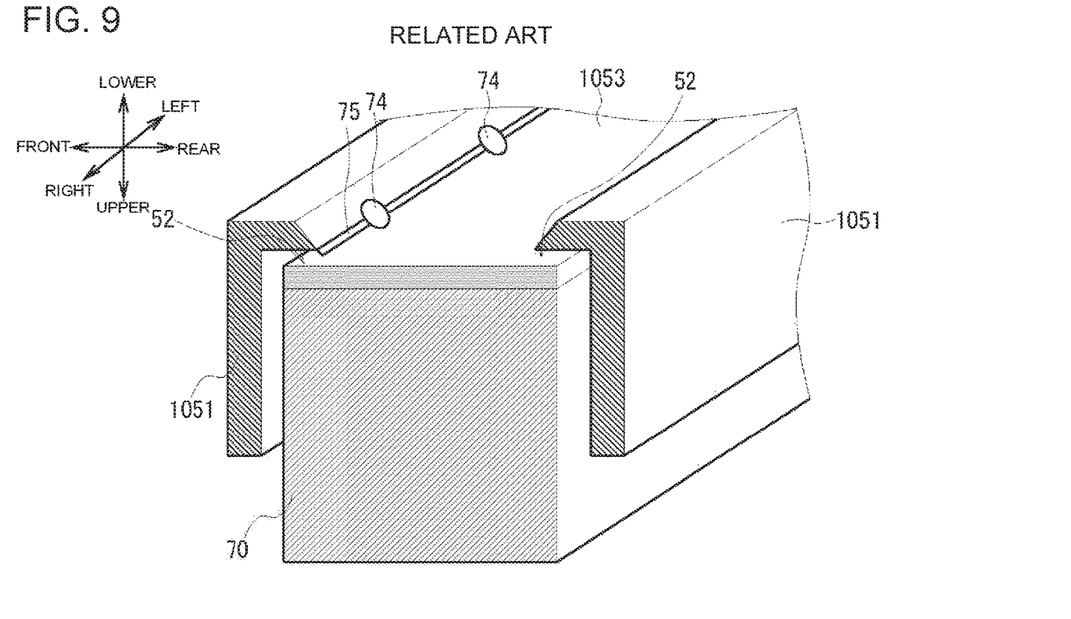
FIG. 9 is a diagram illustrating a cross-sectional view of a method of attaching a cover member according to a related art.

As illustrated in FIG. 9 in which constituents corresponding to those in FIG. 5 are denoted by the same reference signs, an attaching method applicable to a LED head according to a related art includes attaching a holder 1051 to a cover member 1053 at several positions of attachment with a high-viscosity adhesive 74, and then filling the clearance 52 between the positions of attachment with a sealant 75 such as silicone resin. However, according to the conventional attaching method for the LED head, the cover member 1053 is held by the holder 1051 by means of attachment only at the positions of attachment that are discretely arranged in the longitudinal direction of the LED head. This configuration develops a problem of the degree of flatness being not guaranteed among the positions of attachment. Instead, a low-viscosity adhesive may be poured into the entire periphery of the clearance 52. In this case, however, the adhesive is likely to spread between the cover member 1053 and the attachment jig 70. This configuration therefore develops a problem of the cover member 1053 failing to serve as the reference surface and also a problem of a potential flow of the adhesive to a portion of the cover member 1053 that transmits the light.

In contrast, the LED head 16 is designed such that the contact angle $\theta_2$ on the holder-opposing surface 53S1 of the cover member 53 is set larger than the contact angle $\theta_1$ on the cover-opposing surface 51S of the holder 51, and the adhesive having the low viscosity of 300 [mPa·s] or below is poured into the clearance 52 between the cover-opposing surface 51S and the holder-opposing surface 53S1 when the cover member 53 is fixed to the holder 51.

Accordingly, the LED head 16 can cause the adhesive 55 to preferentially spread to the interface with the cover-opposing surface 51S rather than to the interface with the holder-opposing surface 53S1, thus preventing the adhesive 55 from spreading to the lens-opposing surface 53S2 side. In this way, the LED head 16 can fix the lens unit 57 to the holder 51 while securing high positional accuracy and a high degree of flatness with respect to the LED elements 68 and to the photoconductor drum 35 based on an interface between the attachment jig 70 and the cover member 53 (that is, the lens-opposing surface 53S2), thereby improving the quality of the LED head 16.

Moreover, the LED head 16 is designed such that the low-viscosity adhesive 55 is poured into the clearance 52. Accordingly, it is possible to fill the entire periphery of the clearance 52 with the adhesive 55 by using the capillary action. For this reason, the LED head 16 can fix the cover member 53 to the holder 51 over the entire periphery unlike the conventional LED head. Thus, it is possible to transfer the degree of flatness of the attachment jig 70 to the lens-opposing surface 53S2 of the cover member 53 at higher accuracy, and to improve the quality of the LED head 16. Furthermore, the LED head 16 only requires the pouring of adhesive 55. Accordingly, the LED head 16 can bring about simple work for attaching the cover member 53 to the holder 51 in the course of assembly as compared to the case of the conventional LED head. Thus, it is possible to reduce costs of the LED head 16.

As described above, as a consequence of attaching and fixing the cover member 53 to the holder 51 through the entire periphery of the hole peripheral edge portion 51E by using the low-viscosity adhesive 55, the LED head 16 can prevent the adhesive 55 from spreading to the lens-opposing surface 53S2 side while easily establishing the attachment and fixation to the holder 51 by using the capillary action in the state of retaining the degree of flatness of the lens-opposing surface 53S2 of the cover member 53.

According to the above-described configuration, the LED head 16 of the color printer 1 includes: the board 66 on which the LED array 67 as the light emitting elements is arranged; the holder 51 that is provided with the hole portion 51L serving as the opening and that holds the board 66, the cover member 53 that is arranged at the position to shield the hole portion 51L and is attached to the holder 51 by using the adhesive 55; and the lens unit 57 that is arranged between the board 66 and the cover member 53. Here, the LED head 16 satisfies the expression $\theta_1 < \theta_2$, where $\theta_1$ is the contact angle on the cover-opposing surface 51S as a first attachment surface being an attachment surface or a bonding surface of the holder 51 and $\theta_2$ is the contact angle on the holder-opposing surface 53S1 as a second attachment surface being an attachment surface or a bonding surface of the cover member 53.

In this way, the LED head 16 can cause the adhesive 55, which is poured into the clearance 52 between the cover-opposing surface 51S and the holder-opposing surface 53S1 in the course of fixing the cover member 53 to the holder 51, to preferentially spread to the interface with the cover-opposing surface 51S rather than to the interface with the holder-opposing surface 53S1, thus preventing the adhesive 55 from spreading to the lens-opposing surface 53S2 side.

2. Second Embodiment (2-1. Configurations of Color Printer and LED Head)

A color printer 101 (FIG. 1) of a second embodiment is different from the color printer 1 of a first embodiment in that the color printer 101 includes LED heads 116 (116C, 116M, 116Y, and 116K) illustrated in FIGS. 1 and 2 instead of the LED heads 16 (16C, 16M, 16Y, and 16K). Other configurations of the components of the color printer 101 are the same as those of the color printer 1. As illustrated in FIGS. 3A, 3B and 4, each LED head 116 is different from the LED head 16 of a first embodiment in that a cover member 153 is provided instead of the cover member 53. Other configurations of the components of the LED head 116 are the same as those of the LED head 16.

(Configuration of Cover Member)

Figure 10:
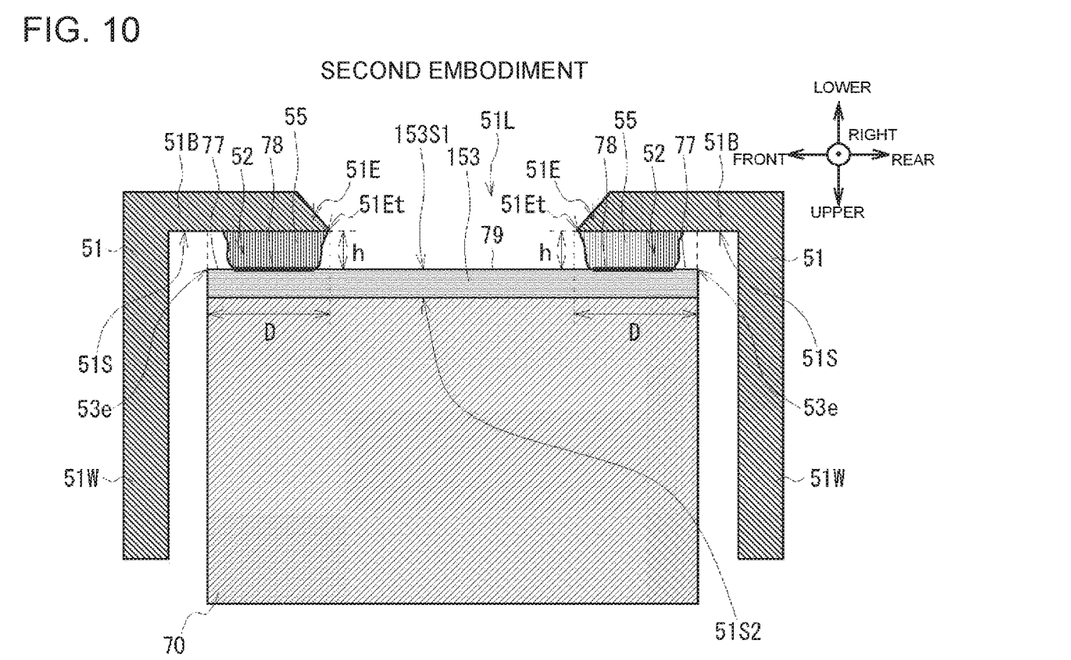
FIG. 10 is a diagram illustrating a cross-sectional view of a configuration at the time of attachment of a cover member according to a second embodiment.
Figure 11:
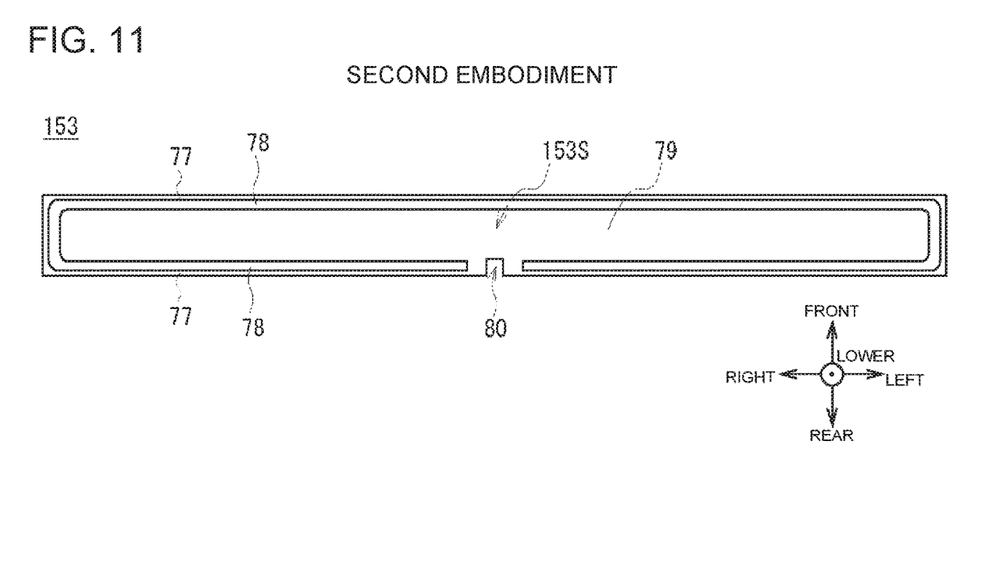
FIG. 11 is a diagram illustrating a bottom view of the cover member according to a second embodiment.

As illustrated in FIG. 11 and in FIG. 10 in which constituents corresponding to those in FIG. 6 are denoted by the same reference signs, a notch 80 is provided to the cover member 153 at a position on a rear side being one end side in a lateral direction and at a central part in a longitudinal direction (the right-left direction). The notch 80 is formed in such a way as to bypass a projection used for positioning the lens unit 57 relative to the holder 51. Thus, the cover member 153 is prevented from physically interfering with the projection.

Meanwhile, an adhesive coated region 78 on a holder-opposing surface 153S1 of the cover member 153 is subjected to a patterned surface treatment. The surface treatment is achieved by conducting a plasma treatment or a surface roughening treatment. The surface treatment is designed to reduce a contact angle. The adhesive coated region 78 is formed inside an outer peripheral edge of the cover member 153 (that is, the cover member end portion 53e) and across the entire periphery except the location of the notch 80 at a width smaller than the length D while providing a small clearance with the outer peripheral edge of the cover member 153. As a consequence, a cover outer edge portion 77 having a predetermined width is formed between the adhesive coated region 78 and the outer peripheral edge of the cover member 153. For this reason, in the cover member 153, a contact angle in the adhesive coated region 78 is smaller than a contact angle in an adhesive uncoated region 79 that is a region of the holder-opposing surface 153S1 other than the adhesive coated region 78.

Here, assuming that a contact angle of the adhesive 55 on the cover-opposing surface 51S of the holder 51 is a contact angle $\theta1$, a contact angle of the adhesive 55 on the adhesive uncoated region 79 of the holder-opposing surface 153S1 of the cover member 153 is a contact angle $\theta2$, and a contact angle of the adhesive 55 in the adhesive coated region 78 of the holder-opposing surface 153S1 of the cover member 153 is a contact angle $\theta3$, the LED head 116 is set to satisfy the contact angle $\theta1$<the contact angle $\theta3$<the contact angle $\theta2$.

As described above, the LED head 116 is subjected to the surface treatment in such a way as to reduce the contact angle in the adhesive coated region 78 on the holder-opposing surface 153S1 of the cover member 153 as compared to the contact angle in the adhesive uncoated region 79. Accordingly, the LED head 116 can improve the wettability in the adhesive coated region 78 on the holder-opposing surface 153S1 as compared to that in the LED head 16. Thus, it is possible to facilitate the movement of the discharged adhesive 55 toward the cover member end portion 53e and thus to fill the clearance 52 with the adhesive 55 more easily.

Meanwhile, in the LED head 116, the contact angle $\theta2$ at the cover outer edge portion 77 being part of the adhesive uncoated region 79 is set larger than the contact angle $\theta3$ in the adhesive coated region 78. In this way, it is possible to design the cover outer edge portion 77 as a region which is less susceptible to the adhesive 55 than the adhesive coated region 78 is. As a consequence, the LED head 116 can readily cause the adhesive 55 moving to the cover member end portion 53e along the adhesive coated region 78 to stop at a boundary between the adhesive coated region 78 and the cover outer edge portion 77, thus preventing the adhesive from spreading between the cover member 153 and the attachment jig 70 more effectively than the case of the LED head 16.

Moreover, by forming the adhesive coated region 78, the LED head 116 can restrict the region to coat the adhesive 55 only to the adhesive coated region 78. As a consequence, the LED head 116 allows coating of the adhesive 55 while bypassing the notch 80. Thus, it is possible to allow the flexibility of the structure of the cover member 153.

From other points of view, the color printer 101 including the LED head 116 of a second embodiment can exert similar operation and effects to those of the color printer 1 including the LED head 16 of a first embodiment.

3. Third Embodiment (3-1. Configuration of Scanner)

Figure 12:
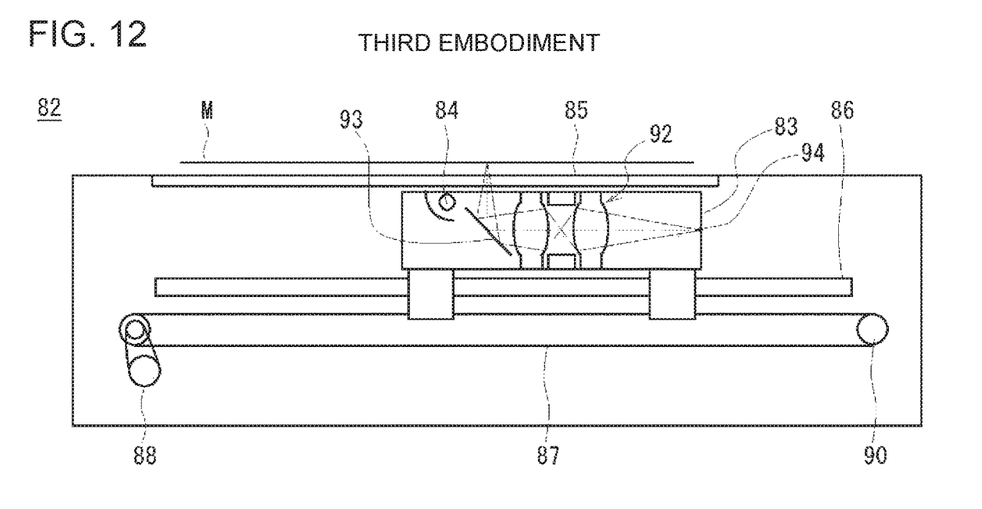
FIG. 12 is a diagram illustrating a side view of a scanner according to a third embodiment.

As illustrated in a side view of FIG. 12, a scanner 82 is a subject copy reading apparatus which generates electronic data by reading a subject copy having A3 size or A4 size, for example. The scanner 82 includes a reading head 83, a lamp 84, a platen 85, a rail 86, a driving member including a driving belt 87 and a motor 88, and the like. The lamp 84 is arranged such that emitted light is reflected from a surface of a subject copy M and is taken into the reading head 83. The platen 85 is made of a material that transmits visible light and the subject copy M is placed thereon. The rail 86 is located below the platen 85 so as to movably support the reading head 83. A portion of the reading head 83 is connected to the driving belt 87 that is stretched between pulleys 90, and the reading head 83 is rendered movable on the rail 86 with the driving belt 87 driven by the motor 88. The reading head 83 takes in light beams that are emitted from the lamp 84 and reflected from the surface of the subject copy M, and converts the reflected light beams into the electronic data.

(3-2. Configuration of Reading Head)

On the whole, the reading head 83 has a configuration in which the LED array 67 (FIG. 4) of the LED head 16 is replaced by the subject copy M being an object, and the photoconductor drums 35 (FIG. 2) are replaced by a line sensor 94 being a detector. The reading head 83 includes a lens unit 92, a mirror 93, and the line sensor 94. The lens unit 92 has a similar configuration to that of the lens unit 57 (FIG. 4) of a first embodiment. The mirror 93 bends an optical path of the light beams reflected from the subject copy M so as to cause the light beams to enter the lens unit 92. The line sensor 94 includes light receiving elements that are linearly arranged at given intervals. The line sensor 94 converts an image on the subject copy formed by the lens unit 92 into electric signals. Since the line sensor 94 has a resolution of 600 [dpi] in an embodiment, 600 light receiving elements are arranged per inch. In other words, the light receiving elements are arranged at intervals of 0.0423 [mm] each in the x direction.

In the above-described configuration, the scanner 82 irradiates the surface of the subject copy M with the light by turning the lamp 84 on, and takes the light beams reflected from the surface of the subject copy M into the reading head 83. The scanner 82 drives the driving belt 87 by using the motor 88 to move the reading head 83 and the lamp 84 in the right-left direction on the sheet surface of FIG. 12, thus taking the light beams reflected from the entire surface of the subject copy M into the reading head 83.

In this instance, the light beams reflected from the subject copy M are passed through the platen 85, then the optical path of the light beams is bent with the mirror 93 whereby the light beams enter the lens unit 92. The image on the subject copy formed with the lens unit 92 is reproduced on the line sensor 94, and the line sensor 94 generates the electronic data by converting the reproduced image on the subject copy into the electric signals.

The scanner 82 including the reading head 83 of a third embodiment can exert similar operation and effects to those of the color printer 1 including the LED head 16 of a first embodiment.

4. Other Embodiments

A first embodiment describes the configuration to set the contact angle θ1 to the angle that is smaller by 5 [°] or above than the contact angle θ2. However, the invention is not limited to this configuration and the difference between the contact angle θ1 and the contact angle θ2e may be set less than 5 [°]. After all, the contact angle θ2 only needs to be set larger than the contact angle θ1 so as to satisfy the contact angle θ1<the contact angle θ2. The same applies to second and third embodiments.

Meanwhile, a second embodiment describes the configuration to subject the holder-opposing surface 153S1 of the cover member 153 to the surface treatment. However, the invention is not limited to this configuration and the cover-opposing surface 51S of the holder 51 may be subjected to the surface treatment in addition to the holder-opposing surface 153S1 of the cover member 153. Alternatively, only the cover-opposing surface 51S of the holder 51 may be subjected to the surface treatment without subjecting the holder-opposing surface 153S1 of the cover member 153 to the surface treatment.

Moreover, a second embodiment describes the configuration to subject the holder-opposing surface 153S1 of the cover member 153 to the surface treatment by conducting a plasma treatment or a surface roughening treatment. However, the invention is not limited to this configuration and the holder-opposing surface 153S1 of the cover member 153 may be subjected to the surface treatment by conducting various other methods so as to reduce the contact angle.

Furthermore, a second embodiment describes the configuration to subject the adhesive coated region 78 on the holder-opposing surface 153S1 of the cover member 153 to the surface treatment so as to render the contact angle in the adhesive coated region 78 smaller than the contact angle in the adhesive uncoated region 79. However, the invention is not limited to this configuration and the adhesive 55 may be prevented from spreading to the lens-opposing surface 53S2 side by subjecting the cover outer edge portion 77 on the holder-opposing surface 153S1 of the cover member 153 to a surface treatment so as to bring about the contact angle at the cover outer edge portion 77 which is larger than the contact angle in the adhesive uncoated region 79.

Figure 13:
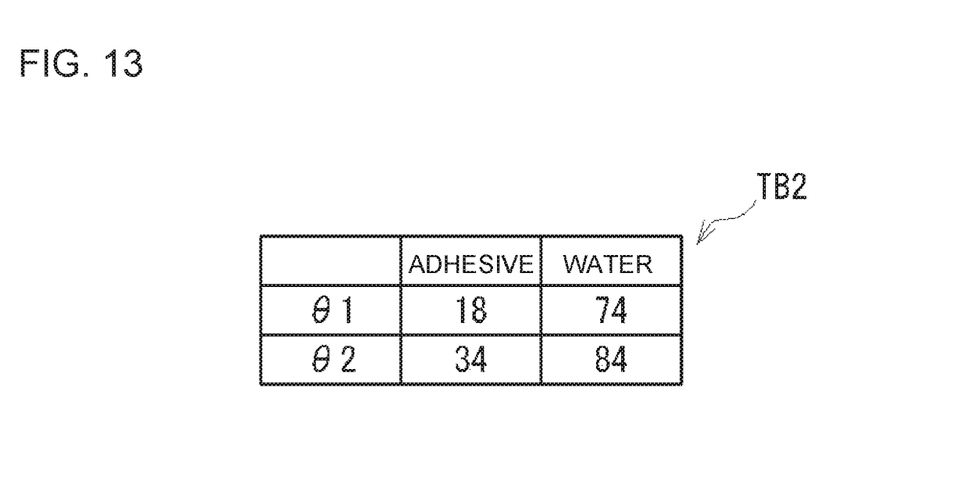
FIG. 13 is a table listing contact angles.

Moreover, each of the embodiments describes the configuration to satisfy the condition defined as the contact angle θ1<the contact angle θ2 regarding the contact angles in the case of using the adhesive having the viscosity of 300 [mPa·s] or below. However, the invention is not limited to this configuration and an equivalent condition may be satisfied in terms of a water contact angle representing a contact angle to water. Values of contact angles of the adhesive 55 and water are listed in a table TB2 in FIG. 13. As indicated in the table TB2, a water contact angle θ1 on the cover-opposing surface 51S of the holder 51 is 74 [°] and a water contact angle θ2 on the holder-opposing surface 53S1 of the cover member 53 is 84 [°]. Accordingly, a relation of the water contact angle θ1<the water contact angle θ2 holds true as with the relation between the contact angle θ1 and the contact angle θ2 mentioned earlier. As described above, the magnitude relation between the contact angles of the adhesive on components has a certain correlation with the relation between the water contact angles on the components. Accordingly, a certain effect can also be obtained by selecting components by referring to the water contact angles thereon.

Furthermore, a first embodiment describes the configuration to use the adhesive 55 which is the ultraviolet-curable resin based on the liquid acrylic resin. However, the invention is not limited to this configuration and various other adhesives satisfying the condition of the contact angles are applicable including, an adhesive that is an ultraviolet-curable resin based on an epoxy-based resin, for example. The same applies to second and third embodiments.

Moreover, a first embodiment describes the case of applying to the LED heads 16 for the respective colors that correspond to the image formation units 15 for the respective colors arranged in series along the front-rear direction in the color printer 1 of the tandem mode. However, without limitation to the foregoing, the invention may be also applicable to LED heads to be mounted on color printers of various other modes such as a four-cycle mode. The same applies to second and third embodiments.

Furthermore, a first embodiment describes the configuration in which the four LED heads 16 corresponding to the four colors of yellow, magenta, cyan, and block are fitted to the printer housing 2 of the color printer 1 that executes color printing. However, the invention is not limited to the foregoing. For example, three or less LED heads or five or more LED heads 16 may be fitted to the printer housing 2 depending on the number of colors of toners used in the color printer. Alternatively, a single LED head 16 may be fitted to a black-and-white printer configured to execute black-and-white printing. The same applies to second and third embodiments.

Moreover, a first embodiment describes the case of applying to the color printer 1. However, without limitation to the foregoing, the invention may be also applicable to other apparatuses including a facsimile machine, a multifunction printer (MFP), a copier, and the like each of which is provided with the LED heads 16 as with the color printer 1. The same applies to second and third embodiments.

Furthermore, a third embodiment describes the case of applying to the scanner 82. However, without limitation to the foregoing, the invention may be also applicable to sensors and switches configured to convert optical signals into electric signals, as well as any of an input-output device, a biometric device, a communication device, a dimensional measurement device, and the like which adopt the aforementioned sensors and switches.

Moreover, the invention is not limited only to the embodiments described above. Specifically, a scope of the invention encompasses embodiments designed by combining part or all of the respective embodiments described above and embodiments designed by extracting part of the respective embodiments described above.

Furthermore, a first embodiment describes the example of the LED head 16 serving as an exposure head that includes the board 66 as a light emitting element board, the holder 51 as a holder, the cover member 53 as a transparent cover, and the lens unit 57 as an optical system, and the example of the color printer 1 serving as an image formation apparatus that includes the LED head 16. However, the invention is not limited to these examples. Specifically, the exposure head may include a light emitting element board, a holder, a transparent cover, and an optical system each adopting any of various other configurations, and the image formation apparatus may include the exposure head thus configured. The same applies to a second embodiment.

The invention may be applicable to an LED head to be mounted on an electrophotographic printer, for example.

The invention includes other embodiments in addition to the above-described embodiments without departing from the spirit of the invention. The embodiments are to be considered in all respects as illustrative, and not restrictive.

The scope of the invention is indicated by the appended claims rather than by the foregoing description. Hence, all configurations including the meaning and range within equivalent arrangements of the claims are intended to be embraced in the invention.

The invention claimed is:

1. An exposure head comprising:
a light emitting element board on which light emitting elements are arranged;
a holder that holds the light emitting element board and is provided with an opening;
a transparent cover arranged at a position to shield the opening, such that a first attachment surface of the holder is attached to a second attachment surface of the transparent cover by using an adhesive; and
an optical system arranged between the light emitting element board and the transparent cover, wherein
the exposure head satisfies an expression defined as $$\theta 1<\theta 2,$$

where θ1 is a contact angle on the first attachment surface representing wettability of the first attachment surface, and θ2 is a contact angle on the second attachment surface representing wettability of the second attachment surface.

2. The exposure head according to claim 1, wherein the optical system is arranged facing a surface of the transparent cover located on an opposite side of the second attachment surface.

3. The exposure head according to claim 1, wherein the optical system includes:
a first lens array in which first lenses are arranged;
a first light shielding member including apertures formed at positions corresponding to the first lenses;
a second lens array in which second lenses are arranged; and
a second light shielding member including apertures formed at positions corresponding to the second lenses, and
the first lens array is arranged in contact with a surface of the transparent cover located on an opposite side of the second attachment surface.

4. The exposure head according to claim 1, wherein a viscosity of the adhesive is equal to or less than 300 mPa·s.

5. The exposure head according to claim 4, wherein each of the contact angles represents a contact angle under a condition where the viscosity of the adhesive is equal to or less than 300 mPa·s.

6. The exposure head according to claim 1, wherein a difference between the angle θ1 and the angle θ2 is equal to or more than 5°.

7. The exposure head according to claim 1, wherein the light emitting element board is fixed to the holder through a hole formed in the holder.

8. The exposure head according to claim 1, wherein the exposure head satisfies expression (1) and expression (2) below:

$$\theta 1<90° \qquad (1); \text{ and}$$

$$\theta 1<\theta 2<180°-\theta 1 \qquad (2).$$

9. The exposure head according to claim 1, wherein at least one of the first attachment surface and the second attachment surface comprises a surface treatment portion thereon that increases or decreases a magnitude of the contact angle thereof.

10. An image formation apparatus comprising:
the exposure head according to claim 1.

11. An image formation apparatus comprising:
the exposure head according to claim 1 configured to emit a light;
an image carrier on which a latent image is formed corresponding to the light emitted from the exposure head;
a development member configured to supply a developer to the latent image on the image carrier thereby forming a developer image on the image carrier;
a transfer member configured to transfer the developer image from the image carrier to a medium; and
a fixation part configured to fix the developer image transferred to the medium onto the medium.

12. A reading head comprising:
a light receiving element board on which light receiving elements are arranged;
a holder that holds the light receiving element board and is provided with an opening;
a transparent cover arranged at a position to shield the opening, such that a first attachment surface of the holder is attached to a second attachment surface of the transparent cover by using an adhesive; and
an optical system arranged between the light receiving element board and the transparent cover, wherein
the reading head satisfies an expression defined as $$\theta 1<\theta 2,$$

where θ1 is a contact angle on the first attachment surface representing wettability of the first attachment surface, and θ2 is a contact angle on the second attachment surface representing wettability of the second attachment surface.

13. A reading apparatus comprising:
the reading head according to claim 12.

14. A reading apparatus comprising:
a platen;
the reading head according to claim 12 that is movable relative to the platen; and
a driving member configured to moves the reading head relative to the platen.

* * * * *